Patented Jan. 17, 1939

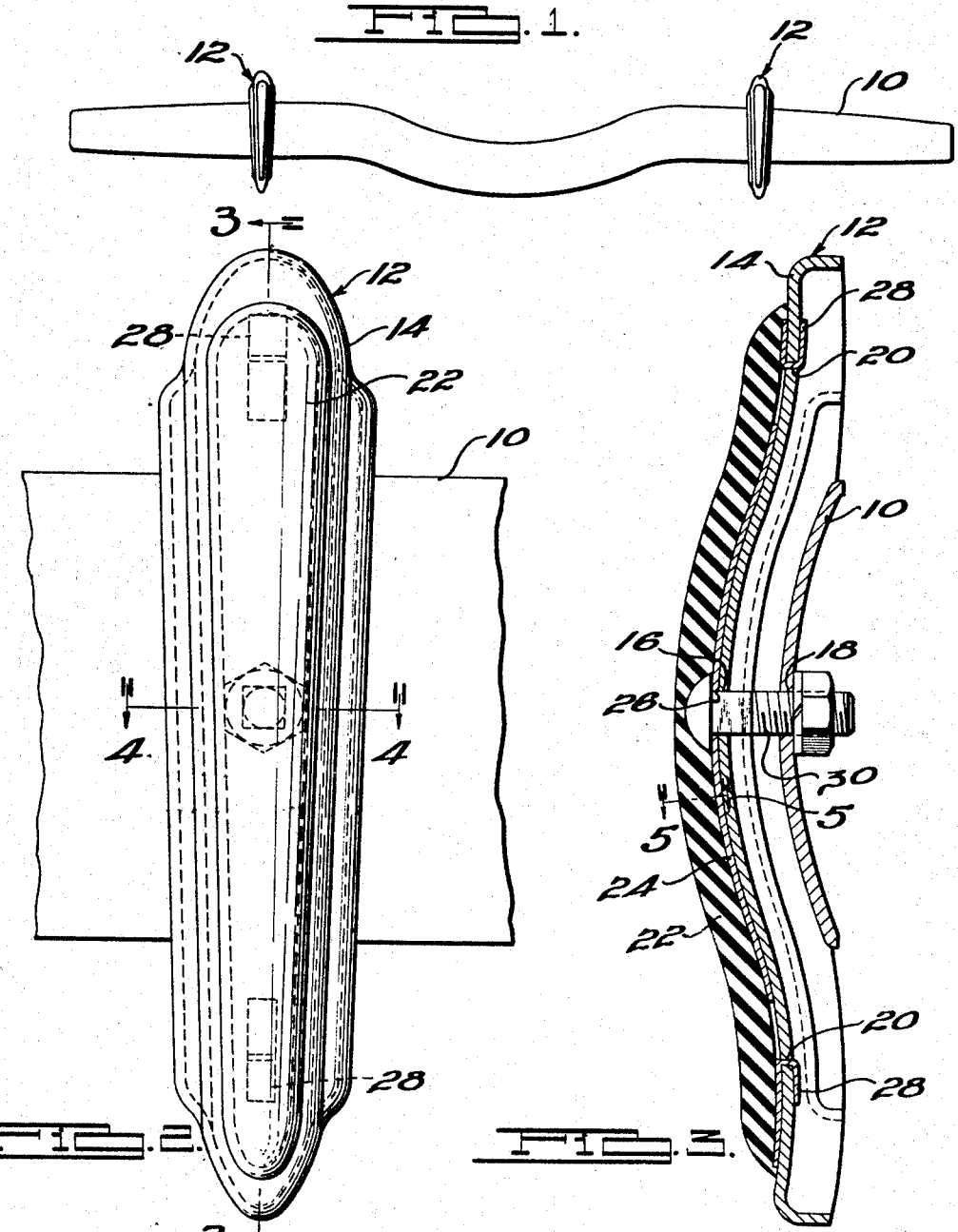

2,144,167

UNITED STATES PATENT OFFICE 2,144,167

BUMPER GUARD

Rufus C. Sanders, Detroit, Mich., assignor to Chrysler Corporation, Highland Park, Mich., a corporation of Delaware Application October 21, 1935, Serial No. 45,913

3 Claims. (Cl. 293—55)

This invention relates to a bumper device for automobiles and more particularly to a guard therefor which is adapted to increase the effective vertical range thereof.

An object of the invention is to provide an improved bumper guard having a detachable cushioning member.

Another object of the invention is to provide, in a bumper guard, improved means for detachably retaining a cushioning member thereof, which means are concealed by the member.

Another object of the invention is to provide a cushioning member having a portion thereof under compression when assembled to a bumper guard.

Another object of the invention is to provide a bumper guard having component parts which may be economically replaced.

Other objects and advantages of the invention will be more apparent from the following description taken in connection with the accompanying drawing, in which:

Fig. 1 is a front elevational view of a bumper having my improved guard secured thereto.

Fig. 2 is an enlarged front elevational view of the improved guard secured to a bumper.

Fig. 3 is a vertical section taken on the line 3—3 of Fig. 2.

Fig. 4 is a transverse section taken on the line 4—4 of Fig. 2.

Fig. 5 is a transverse section taken on the line 5—5 of Fig. 3.

Referring to the drawing, the reference character 10 designates a bumper bar adapted to be positioned at either the front or rear of a motor vehicle and extending transversely thereof. Such member serves to protect the body of the vehicle against contact with other vehicles or with objects in the path of travel of the vehicle. The bumper 10 may be of any desired shape but as illustrated is of concavo-convex form in cross section, the convex face being presented outwardly of the vehicle. A suitable plating is applied to the latter surface to provide an attractive finish. As a means for protecting this finish and as a further aid to the bumper in preventing contact between the bumper of another vehicle and the body due to diversity of heights of bumpers, the bumper bars are provided with guards, generally designated by the numeral 12, which are detachably secured to the bumper bar, one of such guards being arranged adjacent each end of the bar, although the number of such guards and the position thereof on the bumper bar may be varied at will. Portions of the guard extend vertically beyond the upper and lower edges of the bumper bar and are adapted to receive impacts from objects which might otherwise be above or below the bumper bar and be received by the vehicle body.

The guard 12 comprises a pressed metal or cast plate 14 which may be of any suitable design and which has an intermediate portion conforming generally to the contour of the bumper bar 10. The plate 14 has a central aperture 16 adapted to register with an aperture 18 in the bumper 10 when the guard is assembled thereon, and is also provided with openings 20 adjacent the respective ends thereof. The plate 14 may have its outwardly presented exposed surface finished to correspond with the finish of the bumper bar 10.

Detachably secured to the outer face of the plate 14 is a cushioning member 22, preferably formed of a resilient material, such as rubber, and being of sufficient thickness to resiliently cushion impacts received thereby. The member 22 has bonded or otherwise suitably secured thereto a base member or insert 24 composed of metal, which terminates short of the ends of the rubber member 22, and which is narrower than the member 22, thus having its longitudinal edges overlapped thereby, as shown in Fig. 5. The base member 24 gives added rigidity to the cushioning member 22 and provides means cooperating with the plate 14 for rigidly securing the cushioning member to the latter and also for securing the guard proper to the bumper bar 10. An aperture 26 is formed in the base 24 approximately midway of the ends thereof, and integral tongues 28, formed by striking out portions thereof, are provided adjacent the respective ends. Prior to securing the member 22 to the base 24 a bolt 30 is inserted in the aperture 26, the head thereof being embedded in and concealed by the resilient material 22, which is vulcanized or otherwise secured to the base member 24, so that the outer surface of the cushioning member is smooth and uninterrupted.

The guard is assembled by inserting the bolt 30 through the aperture 16 in the plate 14 and the tongues 28 inserted through the registering openings 20 of the plate, the tongues being bent in respectively opposite directions on the inner side of the plate 14. This interengagement between the tongues 28 and the plate 14 serves to retain the extremities of the cushioning member snugly against the plate. The guard is secured to the bumper bar 10 by inserting the bolt 30 through the aperture 18 in the bumper bar and threading a nut on the inwardly disposed end of the bolt.

By having the rubber overlapping the longitudinal edges of the base 24 when the guard is assembled, the longitudinal edges of the rubber are drawn tightly against the adjacent surface of the plate 14. This engagement prevents entry of foreign matter, such as water which might otherwise find its way between the adjacent surfaces and destroy the bond between the resilient material 22 and the base 24. The initial compression of the resilient material will act to take up a certain amount of play between the base 24 and the plate 14 due to loosening of the securing means.

Because of the smooth, uninterrupted surface of the base 24 the molding operation by which the latter part is secured to the material 22 may be performed more economically and with better results than where parts having irregular and interrupted surfaces are involved. This is particularly true when the cushioning material is secured directly to the main part of the guard, such as the plate 14.

Impacts are, for the most part directed against the outer cushioning material 22 of the guard with the result that replacement thereof may be found advisable or necessary. Where such part is replaceable the structure will prove more satisfactory from an economical standpoint than would result from a structure wherein the entire guard would have to be replaced due to damage to the cushioning material alone, as where the latter is initially and permanently united to the main plate.

What I claim is:

1. In a bumper guard, a plate having spaced openings therein, a cushioning member comprising rubber, an intermediate member bonded to said rubber and having one face and its longitudinal edge portions concealed thereby, said intermediate member having portions thereof disposed in said openings respectively and engaging a surface of said plate for detachably securing said intermediate member thereto.

2. In a bumper guard, a plate having a central aperture and a slot adjacent each end portion, a cushioning member comprising rubber, an apertured intermediate member bonded to said rubber and having its outer face and longitudinal edge portions concealed thereby, said intermediate member having portions thereof disposed in said slots and engaging said plate for securing the end portions of said cushioning member to said plate, and means disposed in said apertures securing the intermediate portion of said cushioning member to said plate, a portion of said means being embedded in and concealed by said rubber.

3. In a guard for a bumper, a plate having a central aperture adapted to register with an aperture in said bumper and a slot adjacent each end portion, an impact member comprising rubber adapted to be secured to said plate, a stiffening member bonded to said rubber and having an aperture adapted to register with the aperture in said bumper and said plate, said member having a tongue adjacent each end thereof and disposed in a registering slot of said plate and engaging a surface of the latter, the longitudinal edges of said member being concealed by said rubber, and means securing the guard to a bumper including a member disposed in said registering apertures and having an end portion embedded in and concealed by said rubber.

RUFUS C. SANDERS.